UNITED STATES PATENT OFFICE.

ANTON MESSERSCHMITT, OF STOLBERG, RHINE, GERMANY.

METHOD FOR PRODUCTION OF FERTILIZERS.

1,083,553.  Specification of Letters Patent.  Patented Jan. 6, 1914.

No Drawing.  Application filed April 4, 1912. Serial No. 689,050.

*To all whom it may concern:*

Be it known that I, ANTON MESSERSCHMITT, a subject of the German Emperor, residing in the city of Stolberg, Rhine Province, Germany, have invented new and useful Improvements in Methods for Production of Fertilizers, of which the following is a specification.

It has been suggested long ago to extract alkali metal compounds from silicate-minerals containing alkali metal compounds, as for instance feldspar, mica, phonolite, and the like, by means of lime or calcium compounds, producing soluble alkali-metal compounds. This suggestion, however, has never been accomplished on a commercial scale the reason being that the gain of alkali metal compounds from said minerals seemed to be far too uneconomical.

By the present invention the extraction of alkali metal compounds from minerals containing alkali metal compounds is put on a commercial basis by the fact that those considerable quantities of lime used for rendering soluble said compounds are regained in the form of a novel very valuable product, a fertilizer, while heretofore said lime constituted a real loss. By regaining the lime introduced for said purpose the cost of the method for extracting alkali metal compounds is decreased so much that this method can be applied successfully on a large scale.

The method is as follows: The minerals containing alkali metal compounds and silicates are treated in the known manner with lime or other reactive calcium compound and the soluble alkali metal compounds resulting are extracted by lixiviating the product. The remaining voluminous slime containing much water and which slime was regarded previously as being without any value, is rendered soluble, according to the present invention by treating it with an acid nitrating compound such as nitric acid or nitro-gases, preferably by applying heat. The slime obtained is then evaporated with the addition of lime in excess.

By treating the above described residue with an acid nitrating compound such as nitric acid or nitro-gases, a product is obtained which represents, according to my analysis, essentially a mixture of calcium nitrate, aluminum nitrate, silicic acid, silicic anhydrid, and potassium nitrate. The further addition of lime produces also a mixture of calcium nitrate or basic calcium nitrate, potassium nitrate, aluminum hydroxid, aluminum silicate, and silicic acid.

In the present method not only the lime used for treating the minerals is regained, but the extraction of alkali compounds from the minerals is modified in so far as by this method also those quantities of potassium compounds are made use of which were lost before. It has been tried previously to improve the method of extracting alkali metal compounds from those minerals by lixiviating a considerable number of times. It proved, however, to be impossible to gain all of the alkali metal compounds from the residues by lixiviating with water. According to my experiments the result is satisfactory if about 90% of the alkali metal compounds dissolved are isolated by lixiviation. Besides, up to 30% of alkali metal compounds remain in form of insoluble double-silicates or similar compounds. In general about one-third of all the alkali metal compounds present cannot be gained by the lixiviation process.

In the present method all the soluble and insoluble alkali metal compounds retained in the residues are transformed into soluble nitrates by treating said residues with nitric acid. The method shows surprising and unexpected results with respect to the alkali metal compounds present in insoluble form, for it could only be supposed that only the soluble alkali metal compounds retained mechanically in the slime, therefore in soluble form, would be transformed into soluble nitrates. By the present invention, therefore, the method of extracting alkali metal compounds from silicate-minerals is improved for three reasons, viz. the calcium compounds introduced are regained, the lixiviating process need not be carried to a complete extraction of the alkali compounds as the remaining soluble alkali compounds are regained in my process, and insoluble alkali compounds are also obtained in soluble form.

The products obtained according to the present invention represent, according to my experiments, first-class fertilizers which contain besides the parts soluble in water about 25 to 30% jelly-like, precipitated compounds insoluble in water which surround the soluble nitrates and silicates and prevent thereby the soluble compounds from being washed out too fast in the soil.

According to recent investigations, it is a fact that precipitated silicates and colloidal silicic acid are of great importance for the plants and are very valuable as fertilizer because the silicic acid is absorbed readily by the roots of the plants. Of great importance also is the fact that the fertilizers obtained according to the present invention do not stick together by taking up moisture from the air as other known fertilizers do, as for instance Norwegian saltpeter. Experiments have shown that the present fertilizer takes up about 26.5% water from moist air. It can then still be spread easily and does not stick together while it is generally known that some kinds of saltpeter form hard blocks in the presence of moisture which blocks must be broken up with much difficulty. This advantageous property of the present product is caused probably by the presence of insoluble jelly-like substances surrounding the soluble compounds.

The invention may be modified by filtering after the addition of lime, thus obtaining all the nitrates in the form of calcium nitrate and potassium nitrate in the solution from the insoluble alumina and silica which are precipitated. By the treatment with nitric acid all bases are precipitated while only calcium as basic calcium nitrate and potassium nitrate, respectively, are dissolved. The jelly-like silicic acid present is thereby combined with a base as for instance lime and is transformed into a compound which can be precipitated and filtered. This compound renders it possible to separate it from the aqueous solution contrary to the jelly-like compounds present before. By systematic lixiviation the soluble compounds are separated from the residues and then evaporated to dryness, with or without the addition of further lime. The residues can be used for manufacturing clay products.

I claim:

1. A process for the production of fertilizers, which comprises decomposing silicates containing alkali metal compounds with reactive calcium compounds, partially separating the alkali metal compounds from the mixture by lixiviation, treating the residues of the mixture with an acid nitrating compound and evaporating to dryness.

2. A process for the production of fertilizers, which comprises decomposing silicates containing alkali metal compounds with reactive calcium compounds, partially separating the alkali metal compounds from the mixture by lixiviation, treating the residue of the mixture with an acid nitrating compound, adding an amount of lime sufficient to form basic calcium nitrate, and evaporating to dryness.

3. A process for the production of fertilizers, which comprises decomposing silicates containing alkali metal compounds with lime, partially separating the alkali metal compounds from the mixture by lixiviation, treating the residue of the mixture with an acid nitrating compound, and evaporating to dryness.

4. A process for the production of fertilizers, which comprises decomposing silicates containing alkali metal compounds with lime, partially separating the alkali metal compounds from the mixture by lixiviation, treating the residue of the mixture with nitric oxid gas, then adding caustic lime, lixiviating and evaporating to dryness.

In testimony whereof I affix my signature in presence of two witnesses.

ANTON MESSERSCHMITT.

Witnesses:
PAUL WALTHER,
HENRY QUADFLIEG.